US008059178B2

United States Patent
Hsu et al.

(10) Patent No.: US 8,059,178 B2
(45) Date of Patent: Nov. 15, 2011

(54) CMOS IMAGER FLUSH RESET

(75) Inventors: Sheng Teng Hsu, Camas, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 724 days.

(21) Appl. No.: 12/039,706

(22) Filed: Feb. 28, 2008

(65) Prior Publication Data

US 2009/0219410 A1 Sep. 3, 2009

(51) Int. Cl.
*H04N 3/14* (2006.01)
*H04N 5/235* (2006.01)
(52) U.S. Cl. ..................... 348/308; 348/229.1
(58) Field of Classification Search .......... None
See application file for complete search history.

(56) References Cited

U.S. PATENT DOCUMENTS

| 6,380,976 | B1 * | 4/2002 | Borg | 348/308 |
| 6,424,375 | B1 * | 7/2002 | Fowler | 348/241 |
| 7,205,522 | B2 * | 4/2007 | Krymski | 250/208.1 |
| 7,274,396 | B2 * | 9/2007 | Bock | 348/308 |

OTHER PUBLICATIONS

Bedabrata Pain et al, "An Enhanced-Performance CMOS Imager With a flushed-Reset Photodiode pixel" pp. 48-56, IEEE Trans. On Electron Devices, vol. 50, No. 1, Jan. 2003.
K. M. Findlater et al, "A CMOS Image Sensor With a Double-Junction Active Pixel", IEEE Trans. ED 50, #1, pp. 32-42, Jan. 2003.

* cited by examiner

*Primary Examiner* — Luong T Nguyen
(74) *Attorney, Agent, or Firm* — Law Office of Gerald Maliszewski; Gerald Maliszewski (57) ABSTRACT

A complementary metal oxide semiconductor (CMOS) imager flush reset circuit is provided. The flush reset circuit has an interface to receive first (e.g., $V_{DD}$) and second (e.g., ground) reference voltages. The flush reset circuit has a solitary (flush) signal interface. There is also an interface connected to a transistor set power interface to supply a Vflush1 signal at least one threshold voltage different than the second reference voltage, in response to receiving a flush signal. The flush signal is used to create a CMOS imager hard reset prior to a soft reset.

20 Claims, 9 Drawing Sheets

CMOS IMAGER FLUSH RESET

BACKGROUND OF THE INVENTION

1. Field of the Invention

This invention generally relates to integrated circuit (IC) fabrication and, more particularly, to a complementary metal oxide semiconductor (CMOS) imager flush reset capability.

2. Description of the Related Art

Figure 1:
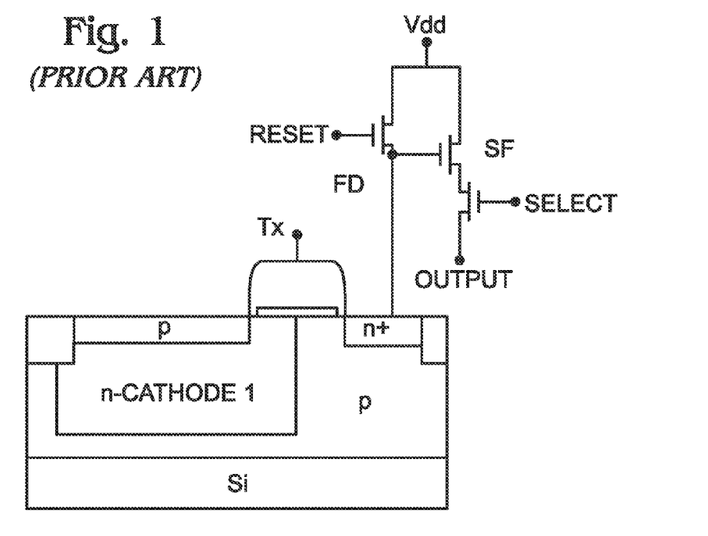
FIG. 1 depicts a complementary metal oxide semiconductor (CMOS) imager with a "buried" or "pinned" photodiode (prior art).

FIG. 1 depicts a complementary metal oxide semiconductor (CMOS) imager with a "buried" or "pinned" photodiode (prior art). Conventionally, the image cell circuit includes four transistors and one photodiode. The pixel operation is divided into three main stages: reset, exposure, and reading.

(1) The reset stage: by turning on the reset and transfer (Tx) transistors, the photodiode capacitance is charged to a reset voltage. As for the case of the p+np buried photodiode shown in FIG. 1, the buried cathode (n) is totally depleted and set to the pinned voltage ($V_{pin}$).

(2) The exposure stage: with the absorption of light by the photodiode, electron and hole pairs are generated. The holes fill the depleted acceptor sites in the p-region, and the electrons fill the depleted donor sites in the n-region. The potential of the photodiode cathode decreases as the photoelectrons fills up at the donor sites.

(3) The reading stage: the pixel value is read out by a correlated double sampling (CDS) circuit. First, the select transistor and the reset transistor are turned on, the floating diffusion (FD) is set to high, and the output is set to the reference level. Then, the transfer transistor (Tx) is turned on, the accumulated photo-electrons in the photodiode are transferred to the FD. Photo-charges in FD are converted to the signal voltage by a source follower (SF) and read out as signal voltage level. The signal is constructed by subtracting the reference voltage level from the signal voltage level (see FIG. 2).

Figure 2:
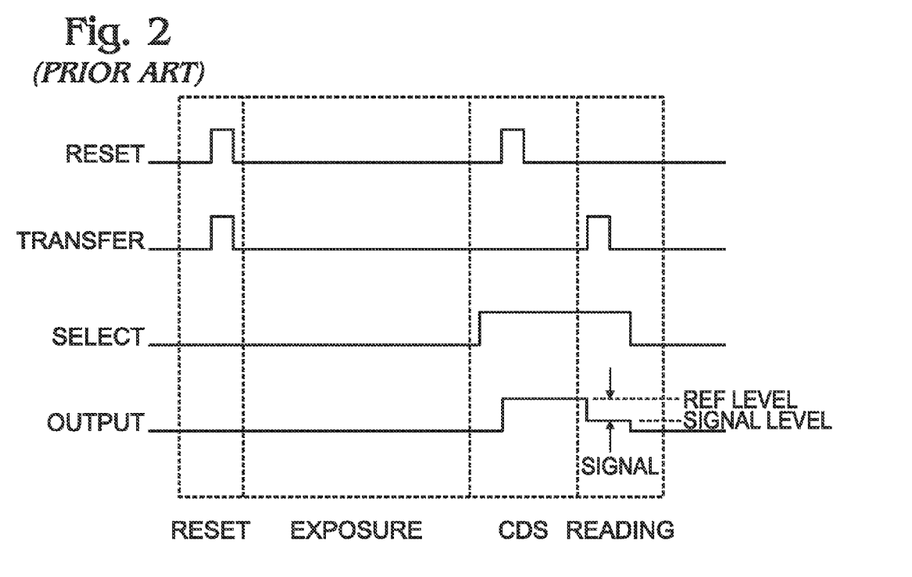
FIG. 2 is a timing diagram associated with of the pixel circuit of FIG. 1 (prior art).

FIG. 2 is a timing diagram associated with of the pixel circuit of FIG. 1 (prior art). The advantage of using a buried photodiode in a CMOS imager sensor is that low dark currents may be obtained. If the charge in the buried n-cathode can be completely depleted during the reset, and the signal electrons in the buried n-cathode can be completely transferred during a CDS reading, then zero lag and zero reset noise can be achieved. Several device design parameters optimization such as: low voltage depleted diode, wide transfer transistor size, low threshold voltage, and high gate voltage on transfer transistor must be considered to achieve the complete transfer of the signal electrons in the buried n-cathode.

A color CMOS imager consists of pixels for detecting red, green, and blue colors using either an RGB color filter array to filter out unwanted spectrum, or by fabricating the photodiodes in a stack, so that the shallower photodiode detects the blue spectrum and the deepest photodiode detects the red spectrum. A pixel of a CMOS imager usually consists of one active pixel sensing (APS) circuit and one photodiode. An APS circuit is referred to herein as a "transistor set". However, to increase the fill factor (the ratio of the photodiode area to the pixel area), a shared transistor set is used in modern CMOS imager fabrication. For a shared transistor set, two to four pixels (two to four photodiodes) typically share one transistor set.

The diode is first reverse biased to create a large depletion region where there are "no" free electrons and free holes. This is called the reset process. The depletion regions extend into both n- and p-regions, with ionized fixed positive charged donors and ionized fixed negative charged acceptors in the depleted n- and p-regions, respectively. When a photon is incident to the depletion region it excites an electron from the valance band to the conduction band. Equivalently, it generates an electron at the conduction band and a hole at the valence band. Due to the potential energy difference, the generated electrons flow to the n region and recombine with an ionized donor state, while the holes flow to the p-region and recombine with the negative charged accepter state. As a result, the space charge region loses negative charges and positive charges. The width of the space charge region varies as the voltage across the space charge region is reduced. In a four-transistor set (4T APS) of FIG. 1, the stored charge in the photodiode is transferred to the floating diffusion. The pixel circuit detects the voltage reduction as the output signal of the floating diffusion. The reduction in floating diffusion voltage is known as charge-to-voltage conversion. The accurate measurement of this voltage reduction is needed to reproduce the color of the object. In a 3T transistor set, or 3T APS cell circuit design, no transfer transistor and charge transfer process are needed. The pixel circuit detects the voltage reduction as output signal of the photo detector directly.

For the 3T transistor set, the sensing circuit detects the photodiode voltage, and the charge in the photodiode is never completely discharged. For the 4T transistor set, the charge transfer from the photodiode to the floating diffusion may not be completed and the charge in the floating diffusion is never completely discharged after the sensing circuit detects the signal. In either case, at the end of sensing, charges remain in the diode and floating diffusion. The amount of the remanding charge in each photodiode (3T), or in each photodiode and floating diffusion (4T) is not identical. As a result, the usual reset process that applies $V_{DD}$ to the gate and drain of the reset transistor, may not reset each photodiode (3T), or each photodiode and floating diffusion (4T) to the same voltage. The above-mentioned process is a "soft reset" and usually accompanies the so-called image lagging phenomenon. In order to avoid the image lagging phenomenon, a hard reset process is used to keep the reset transistor biased in the active region, or keep the gate voltage of the reset transistor higher than the drain voltage of the transistor by at least one threshold voltage. This solution takes care for the image lagging problem, but the reset voltage is low unless the gate of the reset transistor is biased higher than $V_{DD}$, which may induce high voltage stress and result in device reliability failures. If the hard reset is followed up with a soft reset, which pre-charges the sensing circuit (including the bit line) to high voltage state, then fixed pattern noise can be minimized.

Figure 3:
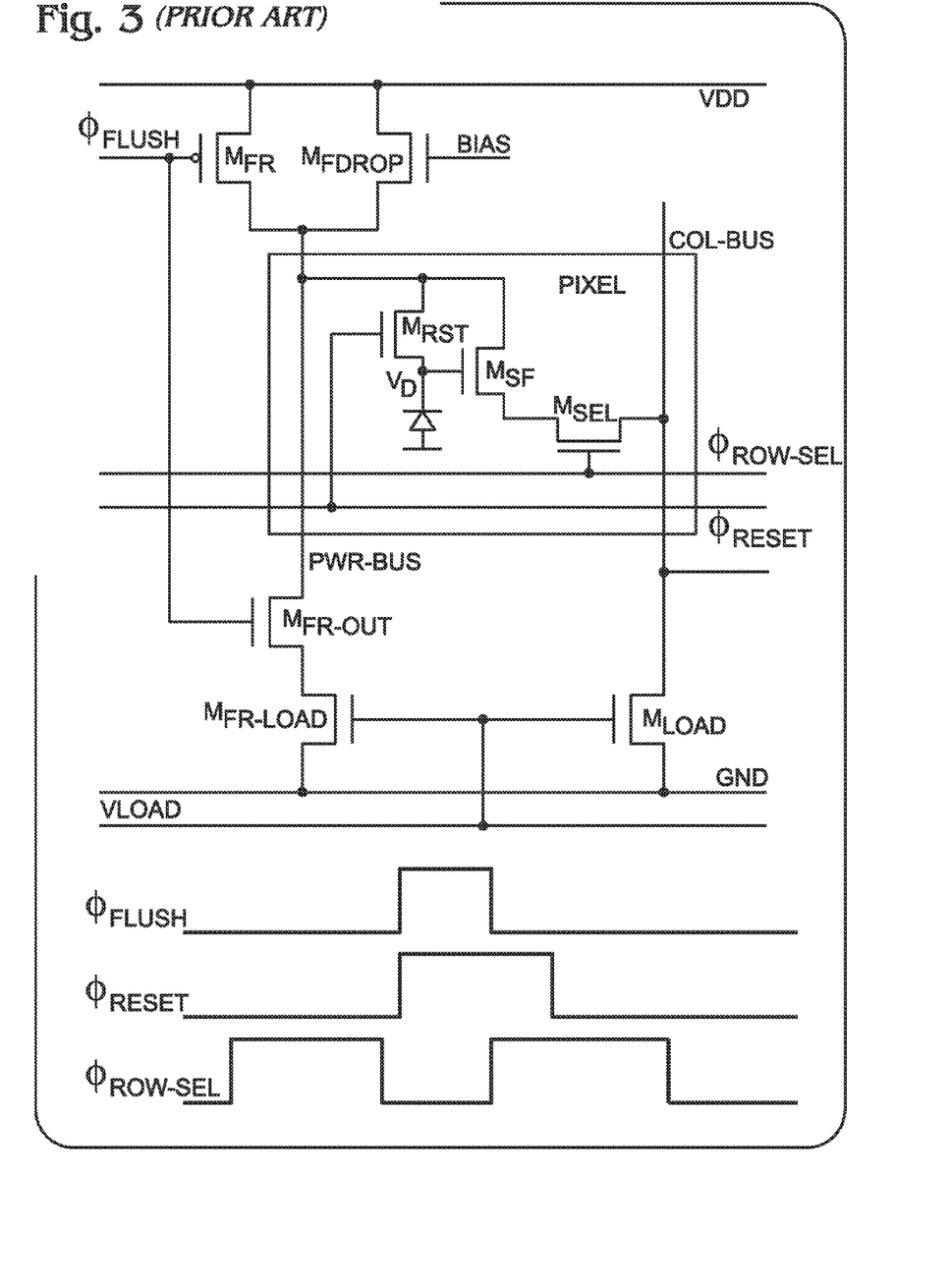
FIG. 3 is a schematic diagram of a pixel with a reset assist circuit and an associated timing diagram for the flushed reset of a pixel (prior art).

FIG. 3 is a schematic diagram of a pixel with a reset assist circuit and an associated timing diagram for the flushed reset of a pixel (prior art). As noted by Bedabrata Pain et al., the above-mentioned problems can be overcome by a flush hard reset followed by a soft reset process. The flushed-reset pixel approach eliminates the disadvantages of both the hard and soft-reset processes while retaining their respective advantages, without modification of the photodiode pixel layout. Therefore, the performance of the photodiode pixel is not altered. As shown, during the early stage of flush reset the $\phi_{flush}$ and $\phi_{reset}$ are on. The transistor $M_{FR}$ is off and $M_{FR-out}$ is on. The transistors $M_{Fdrop}$ and $M_{FR-out}$, $M_{FR-load}$ form a voltage divider. Therefore, the drain voltage of the reset transistor $M_{rst}$ is lower than $V_{DD}$. Since $\phi_{reset}$ is at $V_{DD}$, the voltage at the cathode of the photodiode, $V_D$ is lower than $V_{DD}$ by at least one threshold voltage. After hard reset, the $\phi_{flush}$ is pulses low, and the drain voltage and the gate voltage of the reset transistor $M_{rst}$ are $V_{DD}$, and a soft reset begins.

However, the above-described circuit requires an addition independent bias voltage sources and operating signals. In this circuit there are a bias line, a flush pulse line, a $V_{load}$ line and four (4) transistors added to the conventional active pixel sensing circuit.

It would be advantageous if the above-mentioned reset and the fixed pattern noise problems could be solved with a simple circuit and solitary control signal.

SUMMARY OF THE INVENTION

To address the above-described reset issues, a flush reset circuit is provided. The flush reset circuit interfaces with any convention pixel transistor set. The flush reset circuit is comprised of only four transistors and is operated with a single flush signal. During a flush operation, a voltage divider ($V_{FLUSH}$) is formed at the drain of the reset transistor that is always one or more transistor thresholds lower than the gate of the reset transistor, which is typically $V_{DD}$. Since $V_{FLUSH}$ is lower than $V_{DD}$ by more than one threshold voltage, the image lag problem is eliminated. The cathode of the photodiode can then be soft reset to a high voltage nearly equal to $V_{DD}$ to pre-charge the active pixel sensing circuit before the photodiode select line pulse is turned on. This process minimizes the fixed pattern noise of the sensing circuit.

Accordingly, a CMOS imager flush reset circuit is provided. The flush reset circuit has an interface to receive first (e.g., $V_{DD}$) and second (e.g., ground) reference voltages. The flush reset circuit has a solitary (flush) signal interface. There is also an interface connected to a transistor set power interface to supply a Vflush1 signal at least one threshold voltage different than the second reference voltage, in response to receiving a flush signal.

More explicitly, the flush reset circuit includes a first MOS field effect transistor (MOSFET) having a gate to receive the flush signal, a first source/drain (S/D) connected to the second reference voltage, and a second S/D to supply a Vflush2 voltage, about equal to the Vflush1 voltage, in response to the flush signal pulsing high. A second MOSFET has a gate connected to the first MOSFET second S/D, a first S/D connected to the first reference voltage, and a second S/D connected to the gate. A third MOSFET has a gate to receive the flush signal, a first S/D connected to the second reference voltage, and a second S/D connected to the first transistor set power interface. A fourth MOSFET has a gate to receive the flush signal, a first S/D connected to the first transistor set power interface, and a second S/D connected to the first MOSFET second S/D.

Additional details of the above-described flush reset circuit and a CMOS imager using the flush reset circuit are provided below.

DETAILED DESCRIPTION

Figure 4:
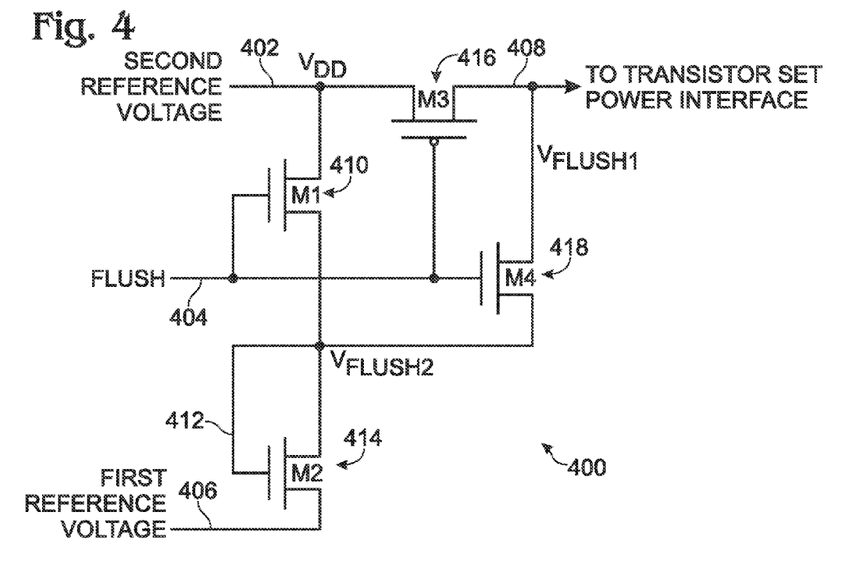
FIG. 4 is a schematic diagram of a CMOS imager flush rest circuit.

FIG. 4 is a schematic diagram of a CMOS imager flush reset circuit. The flush reset circuit 400 comprises an interface on line 402 to receive a second reference voltage, and a solitary signal interface on line 404 to accept the flush signal. An interface on line 406 is connected to a first reference voltage having a lower potential than the second reference voltage. An interface on line 408 is connected to a transistor set power interface to supply a Vflush1 signal at least one threshold voltage different than the second reference voltage, in response to receiving a flush signal. As used herein, a "threshold voltage" refers to a MOSFET gate-source voltage at some predetermined drain current level. Typically, a threshold voltage is in the range of 0.3 to 0.8 volts.

A first MOS field effect transistor (MOSFET) 410 (M1) has a gate to receive the flush signal on line 404, a first source/drain (S/D) connected to the second reference voltage on line 402, and a second S/D to supply a Vflush2 voltage on line 412, about equal to the Vflush1 voltage, in response to the flush signal pulsing high. The value of Vflush2 is $V_{DD} \times R_{M2}/(R_{M2}+R_{M1})$. A second MOSFET 414 (M2) has a gate connected to the first MOSFET second S/D on line 412, a first S/D connected to the first reference voltage on line 406, and a second S/D connected to the gate (line 412).

A third MOSFET 416 (M3) has a gate operatively connected to receive the flush signal on line 404, a first S/D connected to the second reference voltage on line 402, and a second S/D connected to the first transistor set power interface on line 408. A fourth MOSFET 418 (M4) has a gate to receive the flush signal on line 404, a first S/D connected to the first transistor set power interface on line 408, and a second S/D connected to the first MOSFET second S/D on line 412.

As shown, the first MOSFET 410, second MOSFET 414, and fourth MOSFET 418 are NMOS, and the third MOSFET 416 is PMOS having a gate to receive the flush signal on line 404. Alternately but not shown, the third MOSFET 416 may be NMOS and an inverter is used to feed a complementary flush signal to the gate.

The flush signal on line 404 pulses high to a maximum voltage amplitude about equal to the second reference voltage on line 402. The flush reset circuit 400 supplies the second reference voltage to the transistor set power interface on line 408 in response to the flush signal pulsing low.

Figure 5:
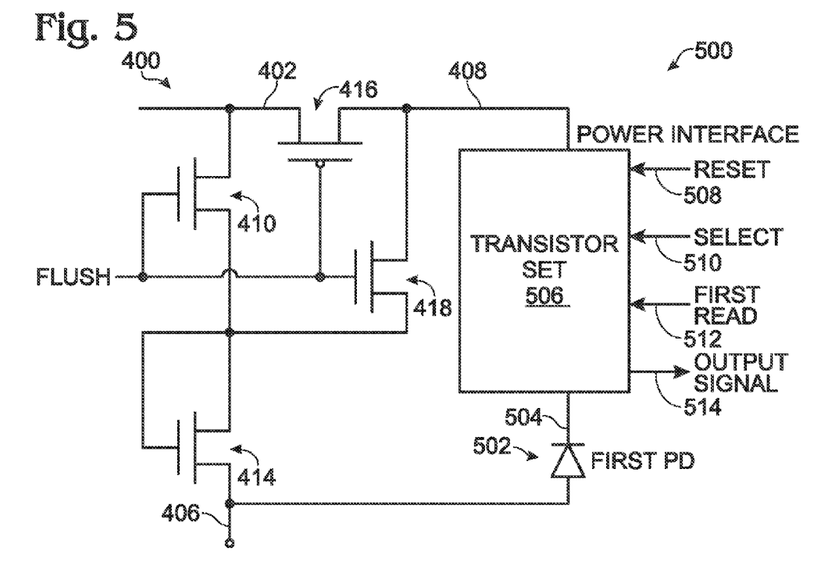
FIG. 5 is a schematic block diagram of a CMOS imager.

FIG. 5 is a schematic block diagram of a CMOS imager. The imager 500 comprises a first photodiode (PD) 502 having a cathode on line 504 to supply a detected voltage, and an anode connected to a first reference voltage on line 406. A first transistor set 506 has an interface connected to the first PD cathode on line 504, a reset signal interface on line 508, a select signal interface on line 510, a first read signal interface on line 512, and a power interface on line 408. The transistor set 506 may alternately be referred to as an active pixel sensing (APS) circuit. The transistor set 506 supplies an output signal representative of the first PD detected voltage on line 514.

Details of the flush reset circuit 400 have been provided above and will not be repeated in the interests of brevity. The flush reset circuit 400 supplies a Vflush1 signal at least one threshold voltage different than the reset signal voltage on line 508 in response to receiving a flush signal on line 404. Typically, both the reset and flush signals pulse high to a maximum voltage amplitude about equal to the second reference voltage.

As described in more detail below, the first transistor set 506 supplies the Vflush1 voltage to the PD cathode on line 504 in response to receiving a reset (line 508), first read (line 512), and select (line 510) signals, concurrently with the flush reset circuit 400 receiving the flush signal on line 404 in a first portion of a reset period.

Figure 6:
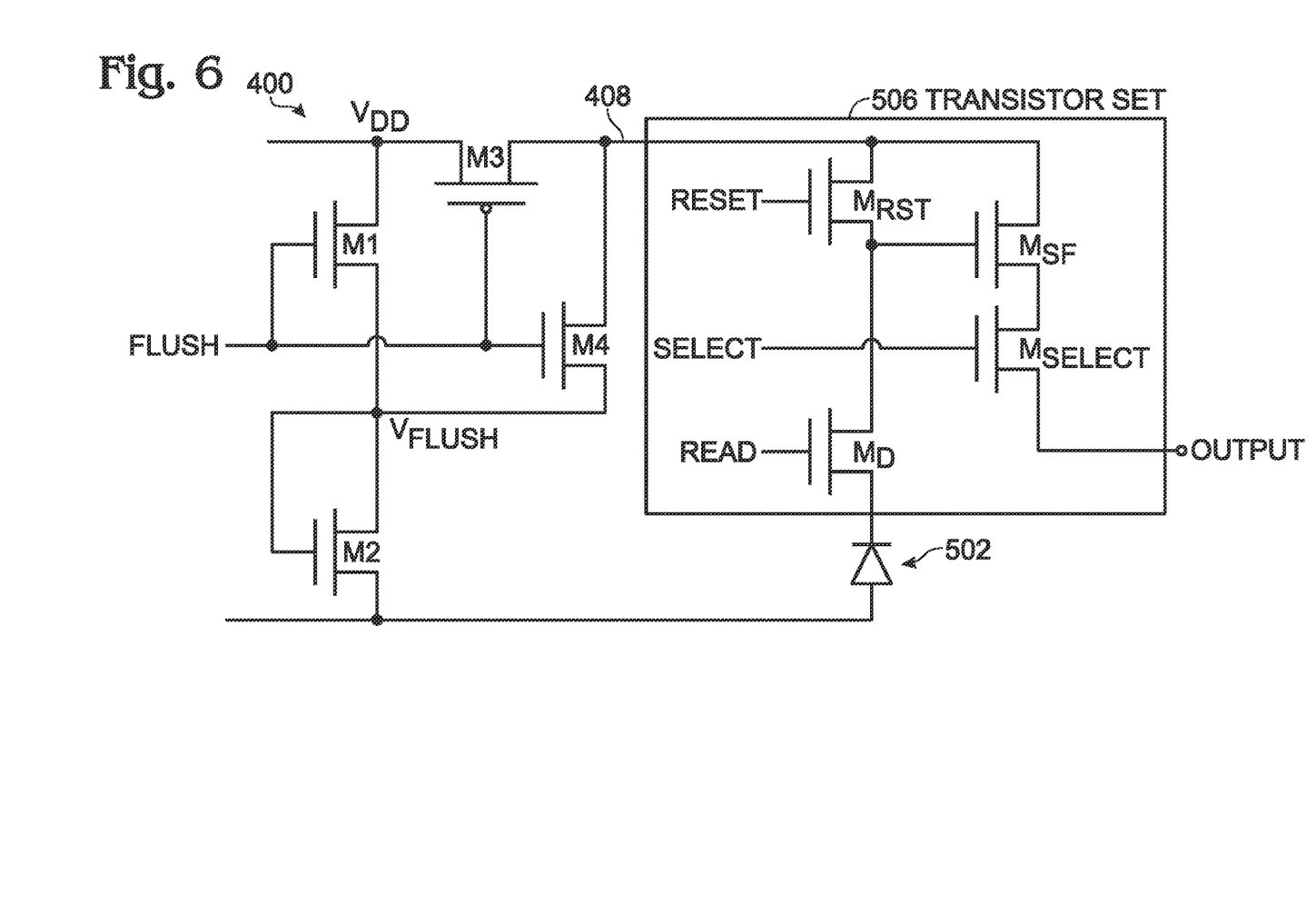
FIG. 6 depicts a conventional four-transistor (4T) set, such as might be used with the flush reset circuit of FIG. 5.

FIG. 6 depicts a conventional four-transistor (4T) set, such as might be used with the flush reset circuit of FIG. 5.

Figure 7:
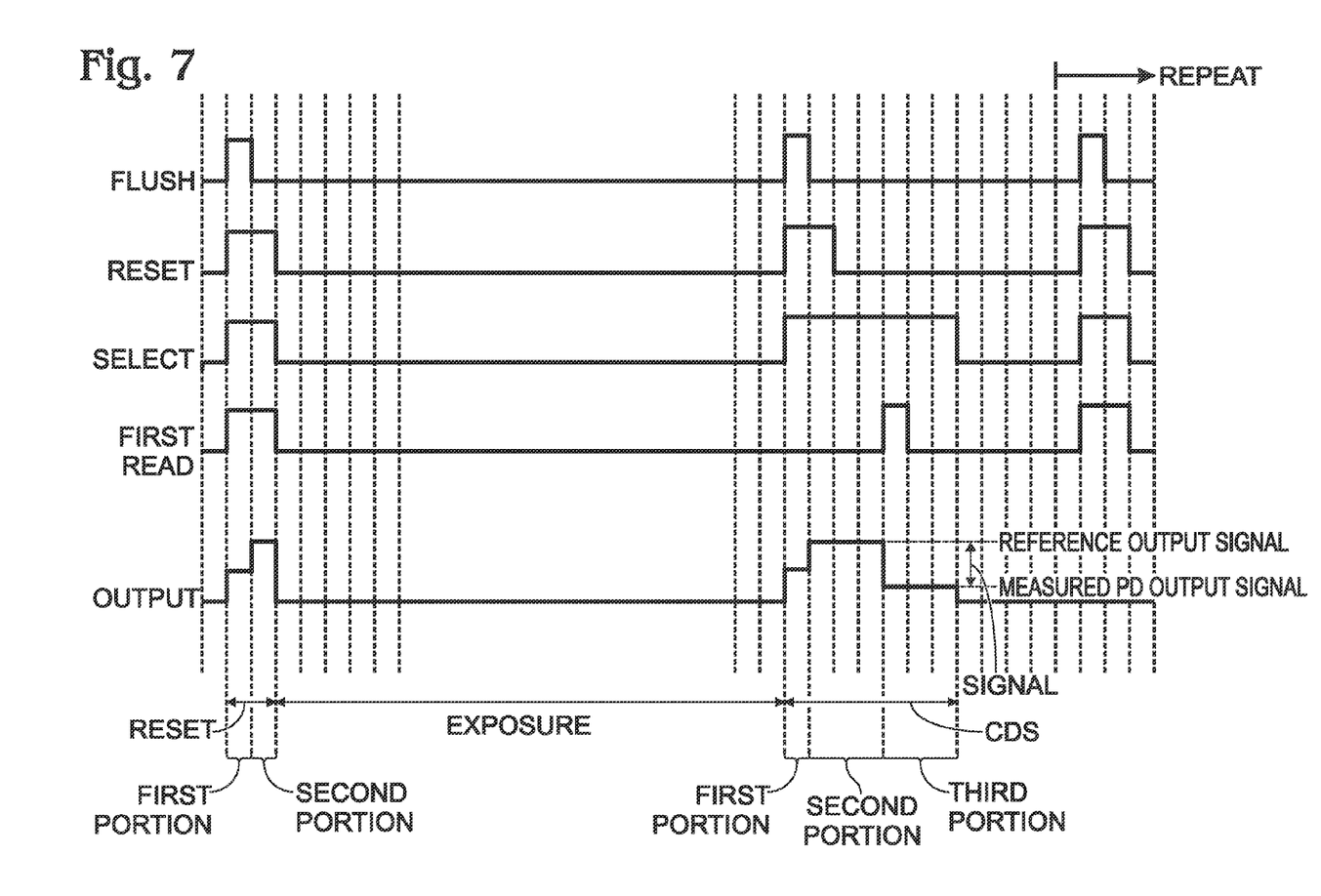
FIG. 7 is a timing diagram associated with the operation of the imager of FIG. 5 and the transistor set of FIG. 6.

FIG. 7 is a timing diagram associated with the operation of the imager of FIG. 5 and the transistor set of FIG. 6. Viewing FIGS. 5 through 7, when the reset, first read, select, and flush signals simultaneously pulse high in the first portion of the reset period (hard reset), the Vflush1 voltage is supplied to the first PD cathode. The flush reset circuit supplies the second reference voltage to the transistor set power interface in response to the flush signal pulsing low, in a second portion of the reset period (soft reset). Then, the transistor set supplies the second reference voltage to the first PD cathode in response to the reset, select, and first read signals pulsing high in the second portion of the reset period.

The transistor set reset, select, and first read signals pulse low in an exposure period, subsequent to the reset period. The first PD cathode detected voltage decreases in response to receiving photon charges in the exposure period.

The flush reset circuit receives a flush signal pulsing high and supplies the Vflush1 voltage to the transistor set power interface in a first portion of a correlated double sampling (CDS) period, subsequent to the exposure period. In a second portion of the CDS period, the flush reset circuit receives a flush signal pulsing low and supplies the second reference voltage to the transistor set power interface. The transistor set receives reset and select signal pulsing high and the first read signal pulsing low in the first portion of the CDS period. In the second portion of the CDS period, the transistor set receives the select signal pulsing high and the first read signals pulsing low. The reset signal also pulses low subsequent to the flush signal pulsing low. The transistor set supplies a PD reference output signal in the second portion of the CDS period.

In a third portion of the CDS period, the transistor set receives the select and first read signals pulsing high, and supplies a measured PD output signal. As can be seen in FIG. 7, it is the difference between the reference and measured signals that is of interest in determining the detected voltage at the first PD cathode.

Figure 8:
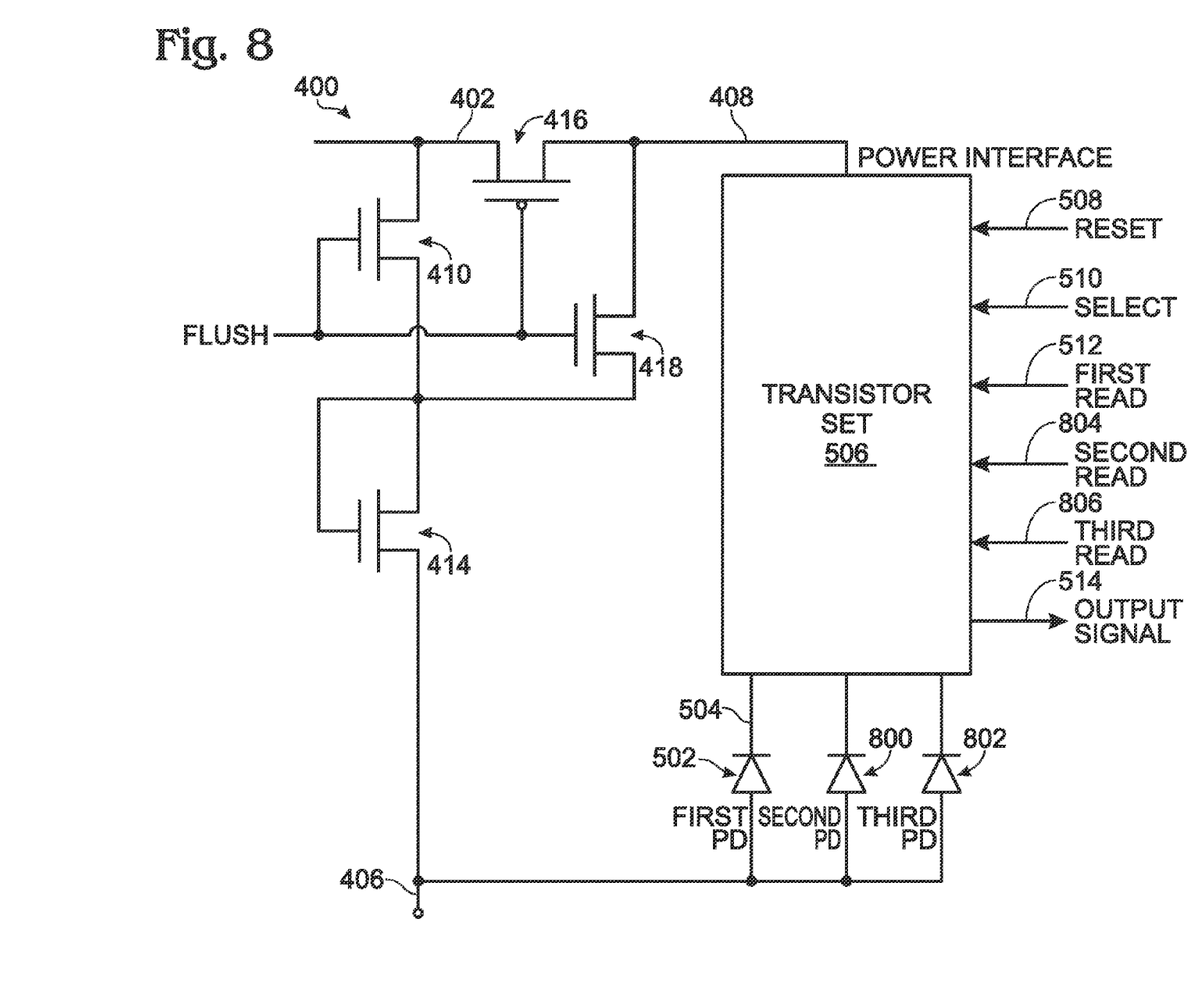
FIG. 8 is a schematic block diagram depicting a first variation of the imager of FIG. 5.

FIG. 8 is a schematic block diagram depicting a first variation of the imager of FIG. 5. Shown are a second PD 800 and third PD 802, each PD having a cathode to supply a detected voltage, and an anode connected to the first reference voltage on line 406. The first transistor set 506 includes second read signal interface on line 804 and third read signal interface on line 806 for the second and third PDs, respectively. As above, the first transistor set 506 supplies an output signal representative of a selected PD detected voltage. Although three PDs are shown in this figure, it should be understood that there are no limitations to the number of PDs that may be interfaced with transistor set 506. For example, two or four PDs may be used.

Figure 9:
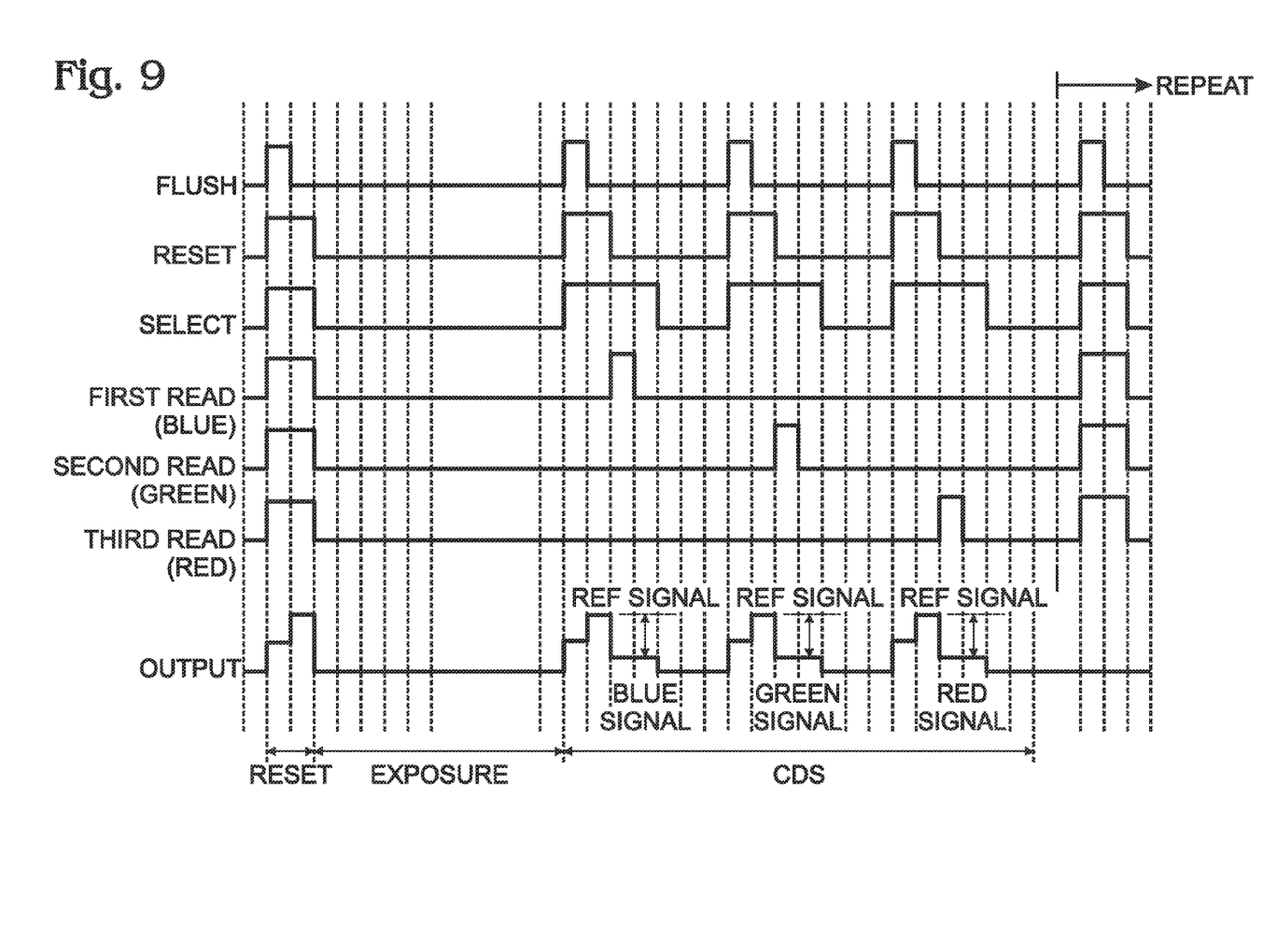
FIG. 9 is a timing diagram associated with the imager of FIG. 8 and the 4T transistor set of FIG. 6.

FIG. 9 is a timing diagram associated with the imager of FIG. 8 and the 4T transistor set of FIG. 6. As would be understood by one with skill in the art, the imager of FIG. 8 permits full (three) color detection.

Figure 10:
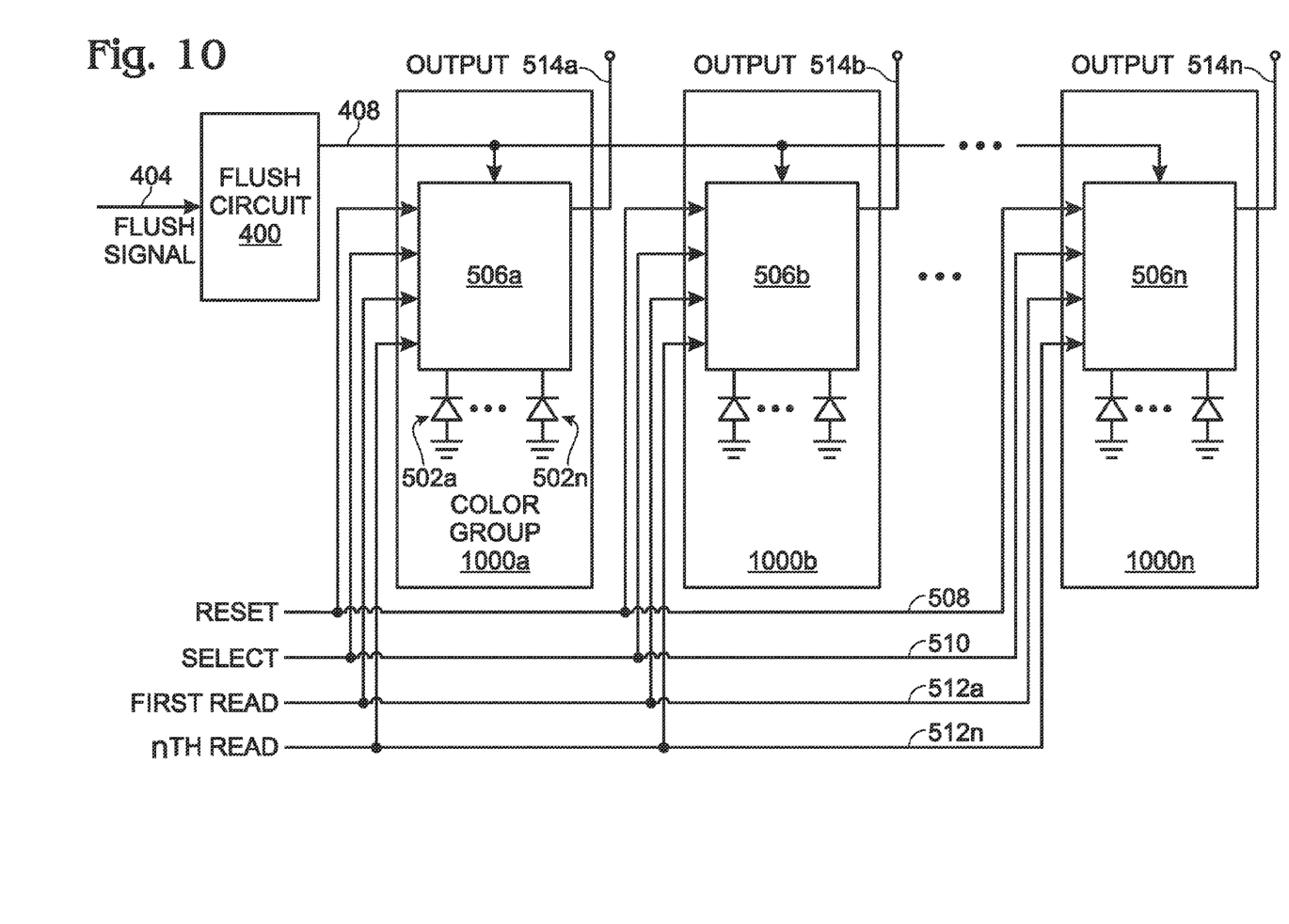
FIG. 10 is a schematic block diagram depicting a second variation of the CMOS imager of FIG. 5.

FIG. 10 is a schematic block diagram depicting a second variation of the CMOS imager of FIG. 5. Shown are a row of PD color groups 1000*a* through 1000*n*, where n is not limited to any particular number. Each PD color group 1000 includes a plurality of PDs. For example, each color group may be comprised of 3 PDs. Each PD has a cathode to supply a detected voltage, and an anode connected to the first voltage reference (e.g., ground). Transistor set 506*a* through 506*n* are shown corresponding to each PD color group 1000*a* through 1000*n*. Each transistor set 506 includes interfaces connected to the cathode of each PD in the color group. Each transistor set has a reset signal interface, a select signal interface, a read signal interface for each PD in the color group, and a power interface on line 408. Each transistor set supplies an output signal representative of a selected PD detected voltage. The flush reset circuit 400 supplies the Vflush1 signal to the power interface (line 408) of each transistor set in response to the flush signal. Alternately but not shown, each color group may consist of a single PD. Two of three PD color groups are also possible.

Figure 11:
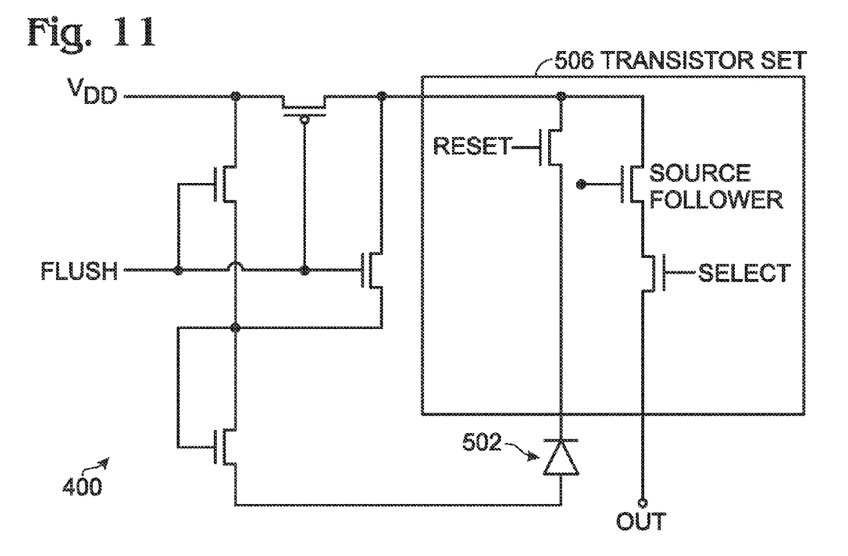
FIG. 11 is a schematic diagram of a third variation of the CMOS imager of FIG. 5 using a conventional 3T transistor set.

FIG. 11 is a schematic diagram of a third variation of the CMOS imager of FIG. 5 using a conventional 3T transistor set. In this configuration, each transistor set is associated with a single photodiode.

Figure 12:
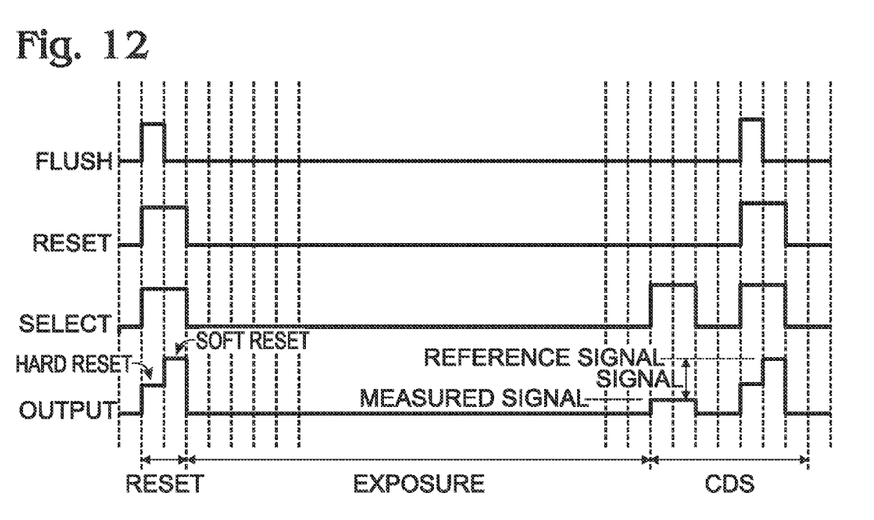
FIG. 12 is a timing diagram associated with the CMOS imager of FIG. 11.

FIG. 12 is a timing diagram associated with the CMOS imager of FIG. 11.

Functional Description

Referring again to FIG. 6, when the flush signal pulses high, transistors, M1, and M4 are on and M3 is off. As a result, transistors M1 and M2 formed a voltage divider, the drain of the reset transistor is equal to $V_{FLUSH1}$, and the gate of the reset transistor is $V_{DD}$. $V_{FLUSH1}$ is always more than one threshold voltage smaller than the reset voltage (typically $V_{DD}$). The gate voltage of the reset transistor $M_{RST}$ is equal to $V_{DD}$ while the drain of $M_{RST}$ is equal to $V_{FLUSH1}$. Since $V_{FLUSH1}$ is lower than $V_{DD}$ by more than one threshold voltage, the cathode of the photodiode is pulled to $V_{FLUSH1}$ immediately, independent of the initial diode voltage. Therefore, image lagging is complete eliminated.

When the flush signal pulses low, M1 and M4 are off while M3 is on. The drain and the gate voltages of $M_{RST}$ are equal to $V_{DD}$. The cathode of the photodiode is soft reset to a high voltage nearly equal to $V_{DD}$ to pre-charge the active pixel sensing circuit, including the bit line, to the high voltage state before the given photodiode select line is pulsed high. This operation minimizes the fixed pattern noise of the sensing circuit. The four transistors of the flush reset circuit and the solitary flush signal control the flush reset process for all pixels without altering conventional transistor set circuitry.

A flush reset circuit has been provided along with a CMOS imager using a flush reset circuit. Some examples of particular circuit elements and signal timing scenarios have been presented to illustrate the invention. However, the invention is not limited to merely these examples. Other variations and embodiments of the invention will occur to those with skill in the art.

We claim:
1. In a complementary metal oxide semiconductor (CMOS) imager, the CMOS imager comprising:
   a photodiode (PD) having a cathode to supply a detected voltage, and an anode connected to a first reference voltage;
   a transistor set having an interface connected to the PD cathode, a reset signal interface, a select signal interface, a read signal interface, and a power interface, the transistor set supplying an output signal representative of the PD detected voltage;
   a flush reset circuit having no more than two reference voltage interfaces including a second interface to receive a second reference voltage, with a higher potential than the first reference voltage and a first interface connected to the first reference voltage, the flush reset circuit further including a flush signal interface and a third interface connected to the power interface of the transistor set to supply a Vflush1 signal having at least one threshold voltage different than a reset signal voltage in response to receiving a flush signal; and,
   wherein the transistor set supplies the Vflush1 voltage to the PD cathode in response to receiving a reset, first read, and select signals, concurrently with the flush reset circuit receiving the flush signal in a first portion of a reset period.

2. The imager of claim 1 wherein the flush reset circuit includes:
   a first MOS field effect transistor (MOSFET) having a gate to receive the flush signal, a first source/drain (S/D) connected to the second reference voltage, and a second S/D to supply a Vflush2 voltage, about equal to Vflush1, in response to the flush signal pulsing high;
   a second MOSFET having a gate connected to the first MOSFET second S/D, a first S/D connected to the first reference voltage, and a second S/D connected to the gate of the second MOSFET;
   a third MOSFET having a gate operatively connected to receive the flush signal, a first S/D connected to the second reference voltage, and a second S/D connected to the power interface of the transistor set; and,
   a fourth MOSFET having a gate to receive the flush signal, a first S/D connected to the transistor set power interface, and a second S/D connected to the second S/D of the first MOSFET.

3. The imager of claim 2 wherein the first, second, and fourth MOSFETs are NMOS, and the third MOSFET is PMOS having a gate to receive the flush signal.

4. The imager of claim 2 wherein the reset and flush signals pulse high to a maximum voltage amplitude about equal to the second reference voltage.

5. The imager of claim 2 wherein the reset, first read, select, and flush signals simultaneously pulse high in the first portion of the reset period to supply the Vflush1 voltage to the first PD cathode.

6. The imager of claim 5 wherein the flush reset circuit supplies the second reference voltage to the power interface of the transistor set in response to the flush signal pulsing low, in a second portion of the reset period; and,
   wherein the transistor set supplies the second reference voltage to the first PD cathode in response to the reset, select, and first read signals pulsing high in the second portion of the reset period.

7. The imager of claim 6 wherein transistor set reset, select, and first read signals pulse low in an exposure period, subsequent to the reset period; and,
   wherein the first PD cathode detected voltage decreases in response to receiving photon charges in the exposure period.

8. The imager of claim 7 the flush reset circuit receives a flush signal pulsing high and supplies the Vflush1 voltage to the power interface of the transistor set in a first portion of a correlated double sampling (CDS) period, subsequent to the exposure period, and receives a flush signal pulsing low and supplies the second reference voltage to the transistor set power interface in a second portion of the CDS period; and,
   wherein the transistor set receives reset and select signal pulsing high and the first read signal pulsing low in the first portion of the CDS period, receives the select signal pulsing high, the first read signal pulsing low, and the reset signal pulsing low subsequent to the flush signal pulsing low in a second portion of the CDS period, and supplies a PD reference output signal in the second portion of the CDS period.

9. The imager of claim 8 wherein the transistor set receives the select and first read signals pulsing high in a third portion of the CDS period, and supplies a measured PD output signal.

10. A complementary metal oxide semiconductor (CMOS) imager flush reset circuit, the CMOS flush reset circuit comprising:
    no more than two reference voltage interfaces, including:
      an interface to receive a second reference voltage;
      an interface connected to a first reference voltage having a lower potential than the second reference voltage;
    an interface connected to a transistor set power interface to supply a Vflush1 signal having at least one threshold voltage different than the second reference voltage, in response to receiving a flush signal; and
    a solitary flush signal interface.

11. The flush reset circuit of claim 10 further comprising:
    a first MOS field effect transistor (MOSFET) having a gate to receive the flush signal, a first source/drain (S/D) connected to the second reference voltage, and a second S/D to supply a Vflush2 voltage, about equal to the Vflush1 voltage, in response to the flush signal pulsing high;
    a second MOSFET having a gate connected to the second S/D of the first MOSFET, a first S/D connected to the first reference voltage, and a second S/D connected to the gate of the second MOSFET;
    a third MOSFET having a gate operatively connected to receive the flush signal, a first S/D connected to the second reference voltage, and a second S/D connected to the transistor set power interface; and,
    a fourth MOSFET having a gate to receive the flush signal, a first S/D connected to the transistor set power interface, and a second S/D connected to the second S/D of the first MOSFET.

12. The flush reset circuit of claim 11 wherein the first, second, and fourth MOSFETs are NMOS, and the third MOSFET is PMOS having a gate to receive the flush signal.

13. The flush reset circuit of claim 11 wherein the flush signal pulses high to a maximum voltage amplitude about equal to the second reference voltage.

14. The flush reset circuit of claim 11 wherein the flush reset circuit supplies the second reference voltage to the transistor set power interface in response to the flush signal pulsing low.

15. In a complementary metal oxide semiconductor (CMOS) imager, the CMOS imager comprising:
    a photodiode (PD) having a cathode to supply a detected voltage, and an anode connected to a first reference voltage;

a transistor set having an interface connected to the PD cathode, a reset signal interface, a select signal interface, a read signal interface, and a power interface, the transistor set supplying an output signal representative of the PD detected voltage;

a flush reset circuit having a second interface to receive a second reference voltage, with a higher potential than the first reference voltage, a flush signal interface, a first interface connected to the first reference voltage, and a third interface connected to the power interface of the transistor set to supply a Vflush1 signal having at least one threshold voltage different than a reset signal voltage in response to receiving a flush signal;

wherein the transistor set supplies the Vflush1 voltage to the PD cathode in response to receiving a reset, first read, and select signals, concurrently with the flush reset circuit receiving the flush signal in a first portion of a reset period;

wherein the flush reset circuit includes:
  a first MOS field effect transistor (MOSFET) having a gate to receive the flush signal, a first source/drain (S/D) connected to the second reference voltage, and a second S/D to supply a Vflush2 voltage, about equal to Vflush1, in response to the flush signal pulsing high;
  a second MOSFET having a gate connected to the first MOSFET second S/D, a first S/D connected to the first reference voltage, and a second S/D connected to the gate of the second MOSFET;
  a third MOSFET having a gate operatively connected to receive the flush signal, a first S/D connected to the second reference voltage, and a second S/D connected to the power interface of the transistor set; and,
  fourth MOSFET having a gate to receive the flush signal, a first S/D connected to the transistor set power interface, and a second S/D connected to the second S/D of the first MOSFET.

16. The imager of claim 15 wherein the first, second, and fourth MOSFETs are NMOS, and the third MOSFET is PMOS having a gate to receive the flush signal.

17. The imager of claim 15 wherein the reset and flush signals pulse high to a maximum voltage amplitude about equal to the second reference voltage.

18. A complementary metal oxide semiconductor (CMOS) imager flush reset circuit, the CMOS imager flush reset circuit comprising:
  an interface to receive a second reference voltage;
  a solitary flush signal interface;
  an interface connected to a first reference voltage having a lower potential than the second reference voltage;
  an interface connected to a transistor set power interface to supply a Vflush1 signal having at least one threshold voltage different than the second reference voltage, in response to receiving a flush signal;
  a first MOS field effect transistor (MOSFET) having a gate to receive the flush signal, a first source/drain (S/D) connected to the second reference voltage, and a second S/D to supply a Vflush2 voltage, about equal to the Vflush1 voltage, in response to the flush signal pulsing high,
  a second MOSFET having a gate connected to the second S/D of the first MOSFET, a first S/D connected to the first reference voltage, and a second S/D connected to the gate of the second MOSFET;
  a third MOSFET having a gate operatively connected to receive the flush signal, a first S/D connected to the second reference voltage, and a second S/D connected to the transistor set power interface; and,
  a fourth MOSFET having a gate to receive the flush signal, a first S/D connected to the transistor set power interface, and a second S/D connected to the second S/D of the first MOSFET.

19. In a complementary metal oxide semiconductor (CMOS) imager, the CMOS imager comprising:
  a photodiode (PD) having a cathode to supply a detected voltage, and an anode connected to a first reference voltage;
  a transistor set having an interface connected to the PD cathode, a reset signal interface, a select signal interface, a read signal interface, and a power interface, the transistor set supplying an output signal representative of the PD detected voltage;
  a four transistor (4T) flush reset circuit having a second interface to receive a second reference voltage, with a higher potential than the first reference voltage, a flush signal interface, a first interface connected to the first reference voltage, and a third interface connected to the power interface of the transistor set to supply a Vflush1 signal having at least one threshold voltage different than a reset signal voltage in response to receiving a flush signal; and,
  wherein the transistor set supplies the Vflush1 voltage to the PD cathode in response to receiving a reset, first read, and select signals, concurrently with the flush reset circuit receiving the flush signal in a first portion of a reset period.

20. A complementary metal oxide semiconductor (CMOS) imager flush reset circuit, the CMOS imager flush reset circuit comprising:
  no more than four MOS field effect transistors (MOSFETs);
  an interface to receive a second reference voltage;
  a solitary flush signal interface;
  an interface connected to a first reference voltage having a lower potential than the second reference voltage; and
  an interface connected to a transistor set power interface to supply a Vflush1 signal having at least one threshold voltage different than the second reference voltage, in response to receiving a flush signal.

* * * * *